(12) United States Patent
Hiddink et al.

(10) Patent No.: US 7,894,844 B2
(45) Date of Patent: Feb. 22, 2011

(54) METHOD AND APPARATUS FOR AUTOMATIC TRANSMIT POWER VARIATION IN A WIRELESS COMMUNICATION SYSTEM

(75) Inventors: Gerritt Willem Hiddink, Utrecht (NL); Adriaan Kamerman, Nieuwegein (NL)

(73) Assignee: Agere Systems Inc., Allentown, PA (US)

( * ) Notice: Subject to any disclaimer, the term of this patent is extended or adjusted under 35 U.S.C. 154(b) by 2213 days.

(21) Appl. No.: 10/745,882

(22) Filed: Dec. 26, 2003

(65) Prior Publication Data

US 2005/0143115 A1    Jun. 30, 2005

(51) Int. Cl.
*H04B 7/00*    (2006.01)
(52) U.S. Cl. ................... 455/522; 455/69; 455/63.4
(58) Field of Classification Search ........... 455/522, 455/69; 370/318
See application file for complete search history.

(56) References Cited

U.S. PATENT DOCUMENTS

| | | | |
|---|---|---|---|
| 6,411,608 B2 * | 6/2002 | Sharony | 370/318 |
| 6,735,420 B2 * | 5/2004 | Baldwin | 455/127.2 |
| 6,879,840 B2 * | 4/2005 | Razavilar et al. | 455/522 |
| 6,904,290 B1 * | 6/2005 | Palenius | 455/522 |
| 7,010,320 B2 * | 3/2006 | Komatsu | 455/522 |
| 2002/0094835 A1 * | 7/2002 | Hayashi et al. | 455/522 |

* cited by examiner

*Primary Examiner*—Nay A Maung
*Assistant Examiner*—Angelica M Perez
(74) *Attorney, Agent, or Firm*—Ryan, Mason & Lewis, LLP

(57) ABSTRACT

A method and apparatus are disclosed for automatic transmit power variation in a wireless communication system. A wireless communication device according to the present invention includes a dynamic transmit power controller that adapts a transmit power level based on a transmission rate of the data. One aspect of the dynamic transmit power controller selects a maximum allowable power level that is based on limits specified for a given region and frequency band, or a maximum directional gain of an antenna (or both). Another aspect of the dynamic transmit power controller selects a maximum capable power level that is based on the transmission rate, frequency band, or characteristics of a transmitter output amplifier (or a combination of the foregoing). Generally, the transmit power level is selected based on a minimum of the maximum allowable power level and the maximum capable power level.

18 Claims, 6 Drawing Sheets

FIG. 4

POWER ALLOWABILITY TABLE -- 400

| LOCATION | EUROPE | | US | | JAPAN | |
|---|---|---|---|---|---|---|
| FREQUENCY RANGE | CCK | OFDM | CCK | OFDM | CCK | OFDM |
| 2400-2483,5 MHz | 18-X | 20-X | 30 | 30 | 18-X | 20-X |
| 2486-2497 MHz | NA | NA | NA | NA | 18-X | NA |
| 4900-5000 MHz | NA | NA | NA | NA | --- | 24 |
| 5030-5091 MHz | NA | NA | NA | NA | --- | 24 |
| 5150-5250 MHz | --- | 17-X | --- | 16 | --- | 22-X |
| 5250-5350 MHz | --- | 17-X | --- | 23 | NA | NA |
| 5470-5725 MHz | --- | 30-X | NA | NA | NA | NA |
| 5725-5825 MHz | NA | NA | --- | 29 | NA | NA |

FIG. 5

POWER CAPABILITY TABLE -- 500

| FREQUENCY RANGE | CCK | OFDM 6 AND 9 Mbps | OFDM 12 AND 18 Mbps | OFDM 24 AND 36 Mbps | OFDM 48 AND 54 Mbps |
|---|---|---|---|---|---|
| 2400-2497 MHz | 20 | 20 | 16 | 14 | 11 |
| 4900-5825 MHz | 18 | 18 | 14 | 12 | 9 |

METHOD AND APPARATUS FOR AUTOMATIC TRANSMIT POWER VARIATION IN A WIRELESS COMMUNICATION SYSTEM

CROSS REFERENCE TO RELATED APPLICATION

The present application is related to U.S. patent application Ser. No. 10/745,883, entitled "Method and Apparatus for Automatic Data Rate Control in a Wireless Communication System," filed contemporaneously herewith and incorporated by reference herein.

FIELD OF THE INVENTION

The present invention relates generally to wireless communication systems, such as wireless local area networks (LANs), and more particularly, to techniques for enhanced transmit power variation in such wireless communication systems.

BACKGROUND OF THE INVENTION

Wireless communications can generally be made more reliable by increasing the power level of the transmitter or by decreasing the transmission data rate to a more robust data rate. The transmit power levels, however, are typically limited by regulations and design constraints of the wireless devices. For example, most countries or regions have regulations that specify particular power level limits for each frequency band. In addition, design constraints generally limit the cost, size and power consumption of wireless devices.

A number of standards have been implemented or proposed that describe a set of minimum requirements that a wireless device must support in order to be compliant with the standard. The standards typically define, for example, signal constellation and frame formats. The IEEE 802.11 standard, for example, and the various extensions to the 802.11 standard, such as 802.11a, b and g, are standards for wireless LAN systems that operate in various frequency bands and provide for various data rates. For a detailed description of the IEEE 802.11 standard, see, for example, IEEE, "Supplement to Standard for Telecommunications and Information Exchange Between Systems—LAN/MAN Specific Requirements—Part 11: Wireless MAC and PHY Specifications: High Speed Physical Layer in the 5 GHz Band," IEEE 802.11a-1999 (September, 1999).

The High Performance Radio Local Area Networks (HIPERLAN) Type 2 standard (HIPERLAN/2) is a standard proposed by the European Telecommunications Standards Institute (ETSI) for wireless LAN systems that operate in the 5 GHz band. The HIPERLAN/2 standard specifies a different set of data rates than the IEEE 802.11 standard. For a detailed description of the HIPERLAN/2 standard, see, for example, ETSI, "Broadband Radio Access Networks (BRAN): 5 GHz High Performance Radio Local Area Networks (HIPERLAN) Type 2, Harmonized EN Covering Essential Requirements of Article 3.2 of the R&TTE Directive," ETSI EN 301 893, v1.2.2, (June, 2003).

In order to meet a given standard, a particular wireless device must support, among other requirements, the set of mandatory data rates. The selection of a particular available data rate by a given wireless device, however, is outside the scope of the standards. In general, there is an inverse relationship between the selection of a transmit power level and a corresponding transmission data rate. In addition, for a number of modulation schemes, higher data rates also require greater linearity in the power amplifier. Thus, to increase the transmit data rate, for example, there generally must be a corresponding decrease in the transmit power level. Likewise, to increase the transmit power level, there generally must be a corresponding decrease in the transmit data rate.

A number of regulatory bodies, including the Federal Communications Commission (FCC) in the United States, European Conference of Postal and Telecommunications Administrations (CEPT) in Europe and Ministry of Posts and Telecommunications (MPT) in Japan, have defined emission limits for various frequency bands. The emission limits typically differ from band to band and from region to region, and in some cases transmit power control is required. In addition, directional antenna gain must be considered to stay within the specified emission limits. As data rates increase, there is a more severe requirement on the tolerable transmit signal error and require more power stage linearity and back off in power level. While the wireless LAN standards, such as IEEE 802.11 and HIPERLAN/2, specify minimum and maximum transmit power levels and a maximum error in the transmitted signal constellation and receiver sensitivity level (which are both data rate dependent), the adaptation of the transmit power level or improving the error in the transmitted signal constellation or the receiver sensitivity is outside the scope of the standards.

A need therefore exists for a method and apparatus for automatic transmit power variation in wireless communication systems, such as wireless LANs. A further need exists for improved techniques for enhanced transmit power variation that can control the transmit power level to meet emission limits and to maintain the transmit power level within amplifier performance limits.

SUMMARY OF THE INVENTION

Generally a method and apparatus are disclosed for automatic transmit power variation in a wireless communication system. A wireless communication device according to the present invention includes a dynamic transmit power controller that adapts a transmit power level based on a transmission rate of the data. One aspect of the dynamic transmit power controller selects a maximum allowable power level that is based on limits specified for a given region and frequency band, or a maximum directional gain of an antenna (or both). Another aspect of the dynamic transmit power controller selects a maximum capable power level that is based on the transmission rate, frequency band or characteristics of a transmitter output amplifier (or a combination of the foregoing). Generally, the transmit power level is selected based on a minimum of the maximum allowable power level and the maximum capable power level.

A more complete understanding of the present invention, as well as further features and advantages of the present invention, will be obtained by reference to the following detailed description and drawings.

BRIEF DESCRIPTION OF THE DRAWINGS

FIG. 4 is a table illustrating an exemplary power allowability look up table that may be implemented by the power allowability logic of FIG. 3;

FIG. 5 is a table illustrating an exemplary power capability look up table that may be implemented by the power capability logic of FIG. 3;

DETAILED DESCRIPTION

Figure 1:
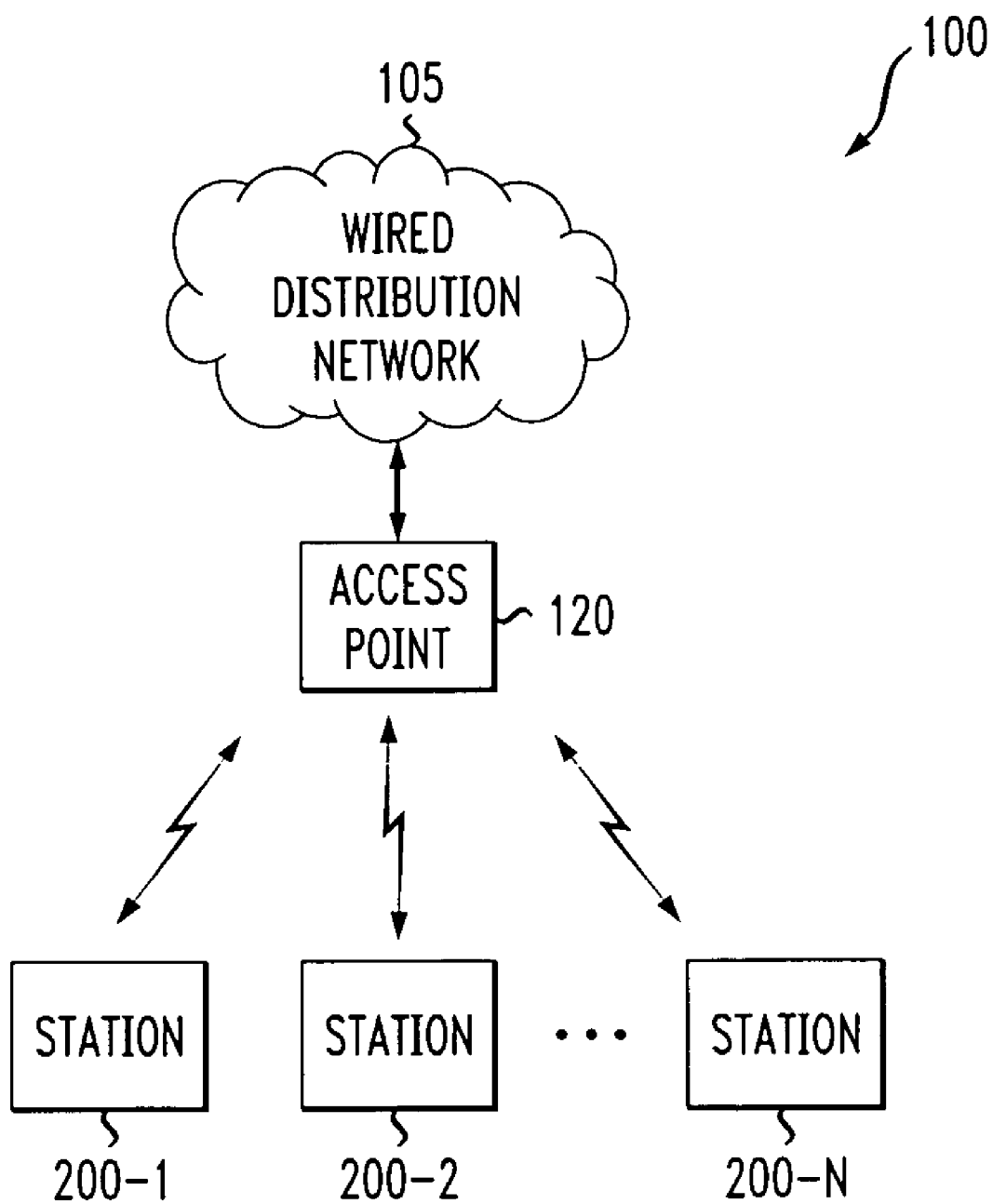
FIG. 1 illustrates a wireless network environment in which the present invention can operate.

FIG. 1 illustrates a wireless network environment 100 in which the present invention can operate. The wireless network environment 100 may be, for example, a wireless LAN or a portion thereof. As shown in FIG. 1, a number of stations 200-1 through 200-N, collectively referred to as stations 200 and discussed below in conjunction with FIG. 2, communicate over one or more wireless channels in the wireless digital communication system 100. An access point 120 is typically connected to a wired distribution network 105 with other access points (not shown). The access point 120 typically provides control and management functions, in a known manner. In addition, the access point 120 acts as a central node through which all traffic is relayed so that the stations 200 can rely on the fact that transmissions will originate from the access point 120. The wireless network environment 100 may be implemented, for example, in accordance with the IEEE 802.11 standard or the various extensions to the 802.11 standard, such as 802.11a, b and g, or the HIPERLAN/2 standard.

The IEEE 802.11 protocol specifies that all communications are relayed via the access point 120, so each transmission that is of interest (other access points 120 may be active on the same radio channel) is from the access point 120 the stations 200 are associated with. An example of such a communications protocol is the Enhanced Service Set (ESS) mode of the IEEE 802.11 protocol, in which stations 200 are associated with an access point 120 that relays all communication.

The access point 120 and wireless stations 200 exchange frames containing information on the transmit power level limits. At the access point 120, the country information is available once the network administrator has configured the access point 120 for country selection. A station 200 receives the information from its access point 120. The frame format for exchanging transmit power level limits is described, for example, in IEEE, "Supplement to Standard for Telecommunications and Information Exchange Between Systems—LAN/MAN Specific Requirements—Part 11: Wireless MAC and PHY Specifications: Spectrum and Transmit Power Management Extensions in the 5 GHz band in Europe," P802.11h/D2.0 (March 2002).

Figure 3:
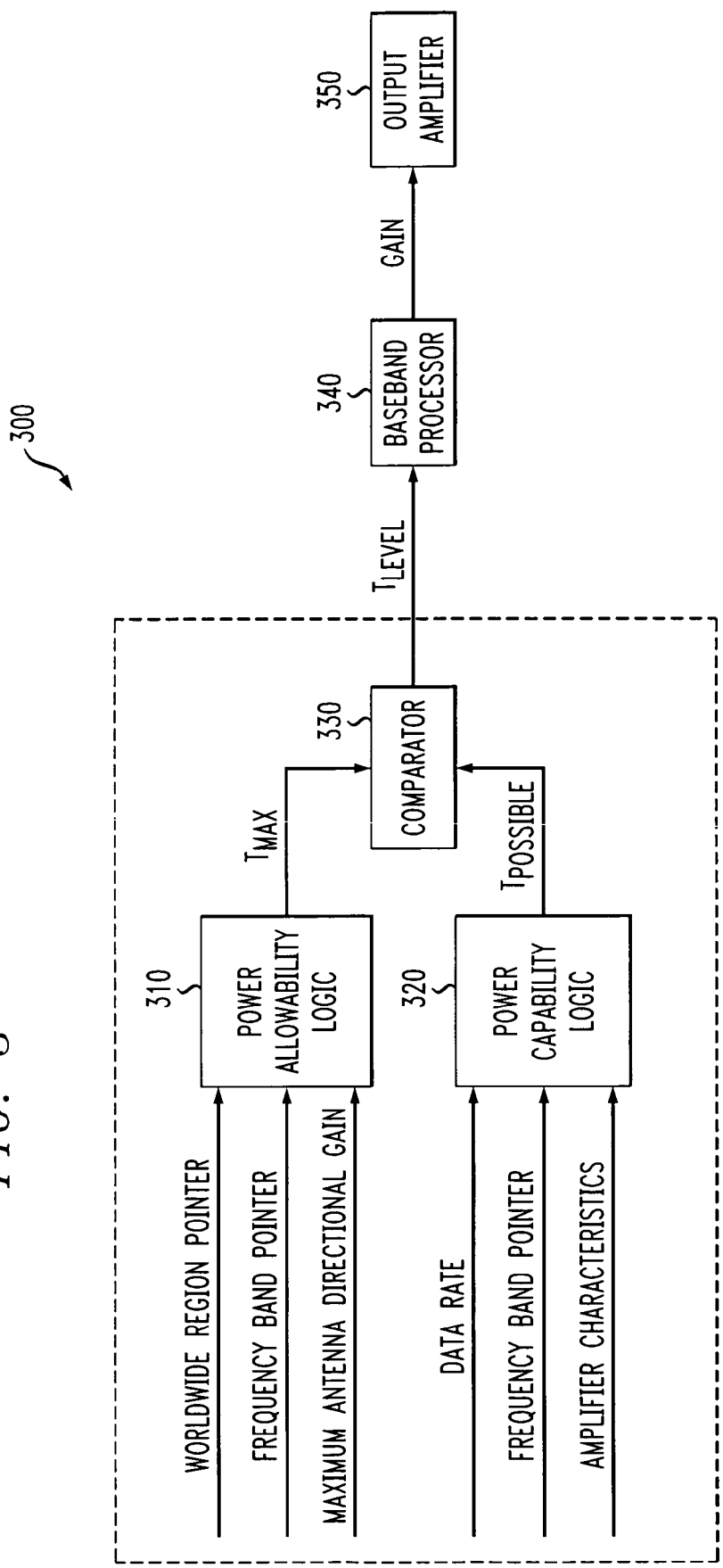
FIG. 3 is a schematic block diagram of a transmit power controller of FIG. 2 incorporating features of the present invention.
Figure 6:
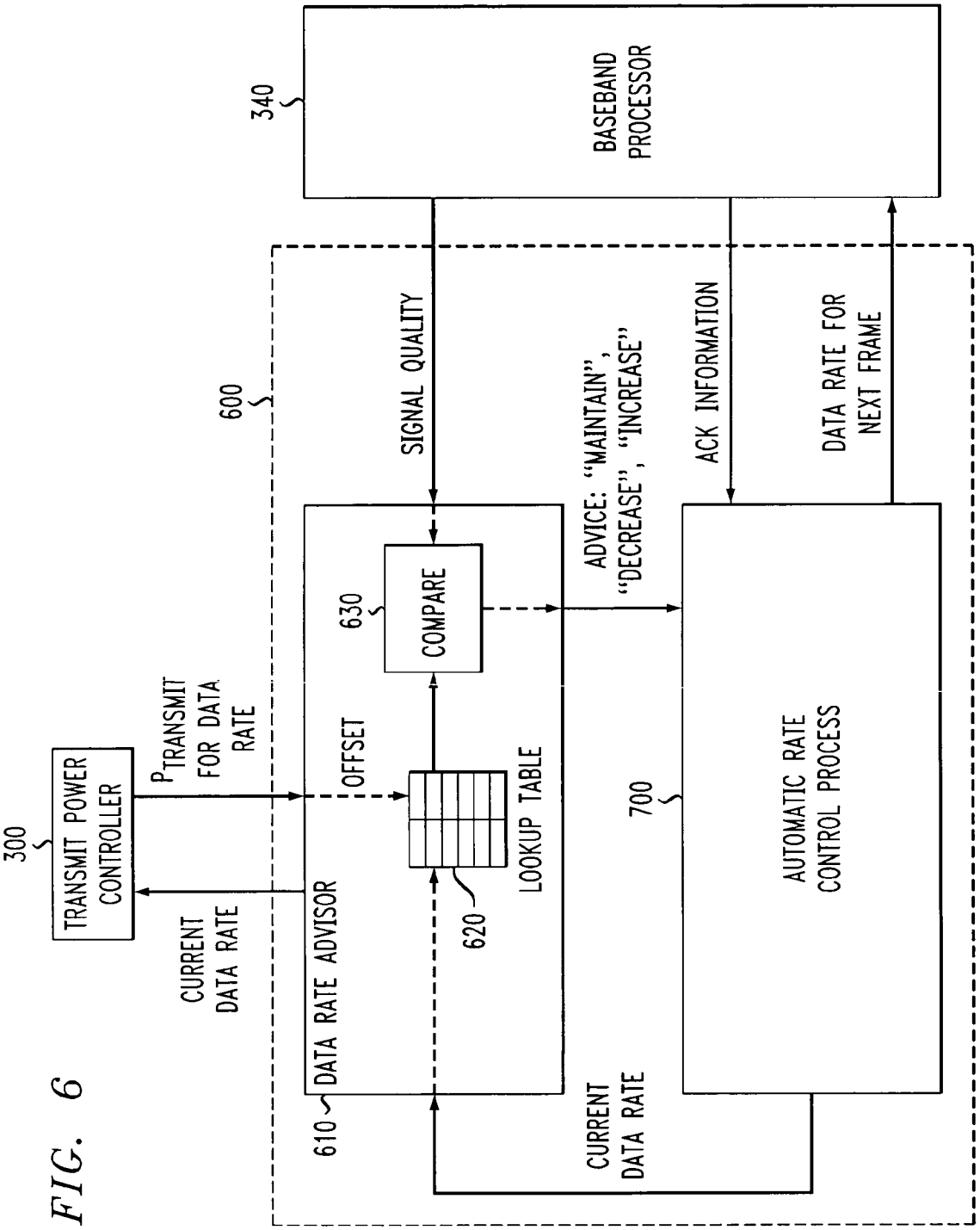
FIG. 6 is a schematic block diagram of an automatic data rate controller of FIG. 2 incorporating features of the present invention.

According to one aspect of the invention, a transmit power controller 300, discussed below in conjunction with FIG. 3, provides transmit power level control based on region-dependent emission limits and data rate-dependent power amplifier linearity limits. According to another aspect of the invention, an automatic data rate controller 600, discussed below in conjunction with FIG. 6, provides an automatic data rate control function that includes several components:

1. a data rate advisor 610 that is a function of the current data rate, the signal quality (e.g. expressed in SNR or in constellation error vector), and the transmit power output of the transmit power controller 300;

2. an automatic rate control process 700, discussed below in conjunction with FIG. 7, for controlling the transmit data rate; and 3. a feedback loop to the transmit power controller 300 to determine the transmit power given the current data rate and the alternative data rate.

It is noted that the transmit power control and transmit data rate control aspects of the present invention can be applied in both stations 200 and access points 120. The present invention allows manufacturers and end users to achieve power variation or data rate control (or both) using a single circuit incorporating the transmit power controller 300 or automatic data rate controller 600 (or both) of the present invention.

Figure 2:
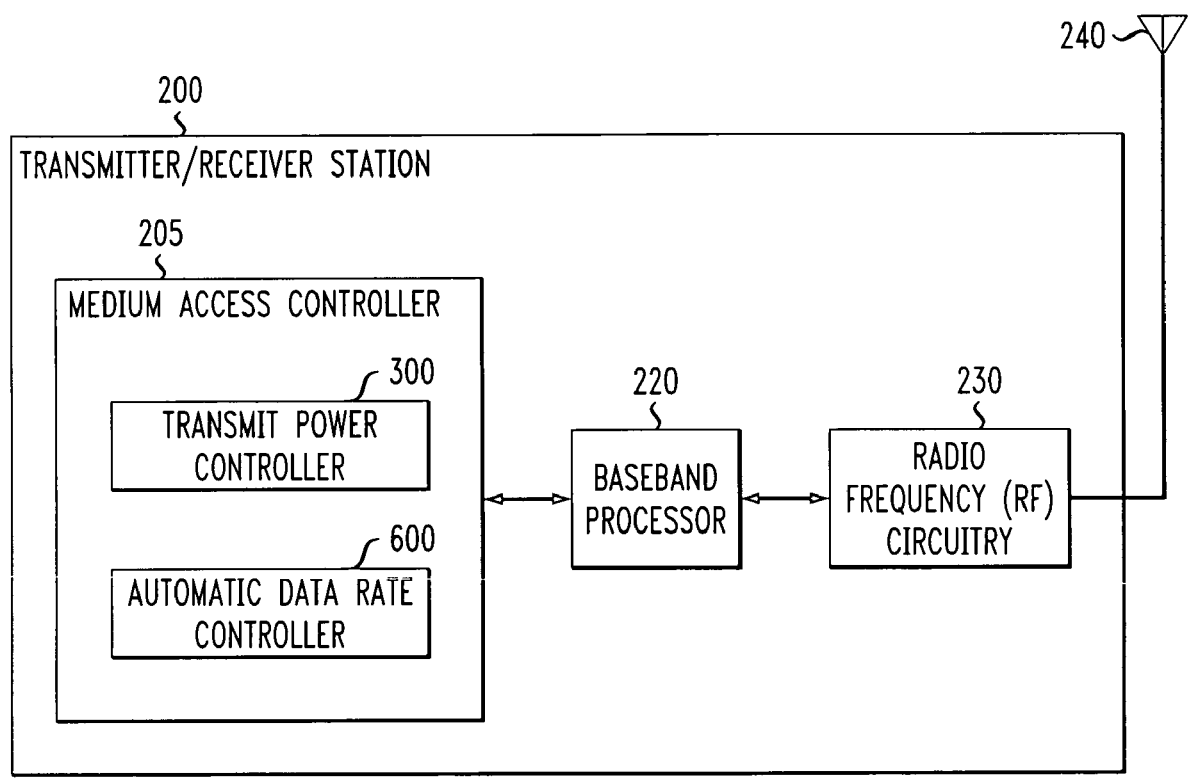
FIG. 2 is a schematic block diagram of an exemplary station of FIG. 1 incorporating features of the present invention.

FIG. 2 is a schematic block diagram of an exemplary transmitter/receiver station 200 (or alternatively, an access point 120) incorporating features of the present invention. The stations 200 may each be embodied, for example, as personal computer devices, or any device having a wireless communication capability, such as a cellular telephone, personal digital assistant or pager, as modified herein to provide the features and functions of the present invention. As shown in FIG. 2, an exemplary station 200 includes a transmit power controller 300, discussed further below in conjunction with FIG. 3, and automatic data rate controller 600, discussed further below in conjunction with FIG. 6. In addition, a transmitter/receiver 300 includes a Medium Access Controller (MAC) 205 that controls the transmission of data. In the exemplary embodiment, the MAC 205 includes the transmit power controller 300 and automatic data rate controller 600. In an alternate implementation, the transmit power controller 300 and automatic data rate controller 600 can be separate devices that interact with the MAC 205. Generally, the automatic data rate controller 600 determines the rate and modulation to be used by the baseband processor 220. The baseband processor 220 provides the signal to the RF circuitry 230, which in turn, provides the signal to the antenna 240, in a known manner.

FIG. 3 is a schematic block diagram of a transmit power controller 300 incorporating features of the present invention. Generally, the transmit power controller 300 determines an appropriate transmit power level based on (i) specified requirements for the given region and frequency band (what is allowed), and (ii) power amplifier characteristics at a given data rate, such as rate-dependent power amplifier linearity limits (capabilities). As shown in FIG. 3, the exemplary transmit power controller 300 provides transmit power level control based on the following input parameters: worldwide region, frequency band, maximum directional gain of the antenna, power amplifier limits and data rate. The present invention gives a selection of the transmitter power level with an emission level within the specified limits (regulations) and provides a transmitter signal with sufficiently low distortion for the selected data rate.

As previously indicated, higher data rates generally have more stringent limits for internal transmitter and receiver degradation. For example, a higher data rate, such as 54 Mbps with OFDM/64-QAM modulation, has more stringent limits for internal transmitter and receiver degradation than a lower data rate, such as 6 Mbps with OFDM/BPSK modulation. Therefore, 54 Mbps needs more back off in power with respect to peak power level in the transmitter power amplifier.

The transmit power controller 300 shown in FIG. 3 includes power allowability logic 310, such as a look up table or programmed logic, for determining an appropriate transmit power level, $T_{max}$ (what is allowed), based on the specified requirements for the given region and frequency band, taking into account directional antenna gain, and power capability logic 320, such as a look up table or programmed logic, for determining an appropriate transmit power level, $T_{possible}$ (what is capable), based on power amplifier characteristics at a given data rate for some frequency band, i.e., rate-dependent power amplifier linearity limits.

The power allowability logic 310 and power capability logic 320 can be implemented with a look-up table or a processing block to produce the transmit power level value based on the set of fixed input parameters (maximum directional gain of the antenna, power amplifier limits), semi-fixed input parameters (worldwide region, frequency band) and variable input parameter (data rate).

As shown in FIG. 3, the transmit power controller 300 also includes a comparator 330 that compares the maximum allowable power level, $T_{max}$, with the maximum capable power level, $T_{possible}$, and selects the minimum value to provide a transmitter output level pointer, $T_{level}$. The transmitter output level pointer, $T_{level}$, provides an input to a baseband processor 340 that uses the transmitter output level pointer, $T_{level}$, as index to determine an appropriate gain value to the transmitter output amplifier 350.

The input parameters to the power allowability logic 310 are (i) a worldwide region pointer, specifying, for example, whether the appropriate regulatory body is the FCC, CEPT, MPT or another body; (ii) a frequency band pointer identifying the channel frequency, and (iii) the maximum directional gain of the antenna (generally manufacturer specific, and specified in dBi). Given the emission limits for a given region, as specified, for example, by the FCC, CEPT, MPT or another regulatory body, and directional gain specifications, as specified by the antenna manufacturers, a person of ordinary skill in the art can generate an appropriate look-up table 310, indexed by frequency values. As indicated above, for some regions and frequency bands, transmit power control with a maximum for the highest and lowest possible transmit power level are required. Transmit power control regulations for Europe are described, for example, in ETSI, "Broadband Radio Access Networks (BRAN): 5 GHz High Performance Radio Local Area Networks (HIPERLAN) Type 2, Harmonized EN Covering Essential Requirements of Article 3.2 of the R&TTE Directive," ETSI EN 301 893, v1.2.2, (June, 2003), while transmit power control regulations for the United States are described, for example, in FCC 03-110, "Notice of Proposed Rulemaking," ET Docket No. 03-122, sec. 24, p. 10 (Jun. 4, 2003).

FIG. 4 is a table illustrating an exemplary power allowability look up table 400 that may be implemented by the power allowability logic 310. As shown in FIG. 4, the exemplary power allowability table 400 specifies the maximum power levels, $T_{max}$, (in dBm) for various regions (Europe, US and Japan), where X is the maximum directional gain in dBi (in the United States there is a tolerance of 6 dBi).

The input parameters to the power capability logic 320 are (i) the data rate, (ii) the frequency band, and (iii) transmitter output amplifier characteristics; generally, in terms of maximum power levels per data rate to stay within error vector limits and distortion limits (providing details of the power amplifier for each rate). Given the transmitter output amplifier characteristics in terms of maximum power levels for each data rate, a person of ordinary skill in the art can generate an appropriate look-up table 320, indexed by data rate.

FIG. 5 is a table illustrating an exemplary power capability look up table 500 that may be implemented by the power capability logic 320. As shown in FIG. 5, the exemplary power capability table 500 specifies the capable transmit power level, $T_{possible}$, (in dBm) for a given data rate, modulation type and frequency range. The exemplary data in the table 500 is for an exemplary power amplifier that can handle 20 dBm at 6 Mbps (and CCK rates) at 2.4 GHz and 11 dBm at 54 Mbps at 2.4 GHz, and the 2 dB lower values for the 5 GHz band.

FIG. 6 is a schematic block diagram of an automatic data rate controller 600 incorporating features of the present invention. Generally, the automatic data rate controller 600 provides rate control adaptation based on whether acknowledgements (ACKs) are received or missed and information from a data rate advisor 610. As discussed further below, the data rate advisor 610 uses signal quality information received from the baseband processor 340. The signal quality is derived from the received signal strength and the noise level as measured during a silence period by some averaging, or derived from the received EVM (error vector magnitude, as described in the 802.11a standard). According to one aspect of the invention, the automatic data rate controller 600 provides data rate adaptation that considers signal quality changes due to changes in the transmit power level in relation to amplifier non-linearities and regulatory emission limits. In addition, the automatic data rate controller 600 provides adaptation of the data rate with respect to the anticipated signal quality for the next frame transmission.

As previously indicated, the automatic data rate controller 600 includes a data rate advisor 610, an automatic rate control process 700, and a feedback loop to the transmit power controller 300. As shown in FIG. 6, the exemplary data rate advisor 610 uses a lookup table 620 that is indexed using the current data rate. The lookup table 620 provides, as an output, the minimum signal quality that the transmission channel is required to have in order to reliably transmit at a given data rate. The rate advisor 610 may optionally use a safety margin above and below the specified signal quality. Thus, if a comparator 630 determines that the current signal quality is below the minimum required signal quality (minus a margin) then the data rate advisor 610 will provide rate advice of "decrease." If the comparator 630 determines that the current signal quality is above the minimum required signal quality (plus a margin) then the rate advice will be "increase."

The data in the lookup table 620 can be offset with a Transmit Power correction value (in dB) to compensate for possible lower transmit powers due to regulatory requirements or power amplifier non-linearities that prohibit the transmitter from sending at the highest possible transmit power. For example, if the lookup table 620 contains signal quality values for each data rate that correspond to a normalized transmit power of 15 dBm, then an offset of 5 dB has to be used if regulatory requirements specify that only a maximum of 10 dBm output power can be used.

Figure 7:
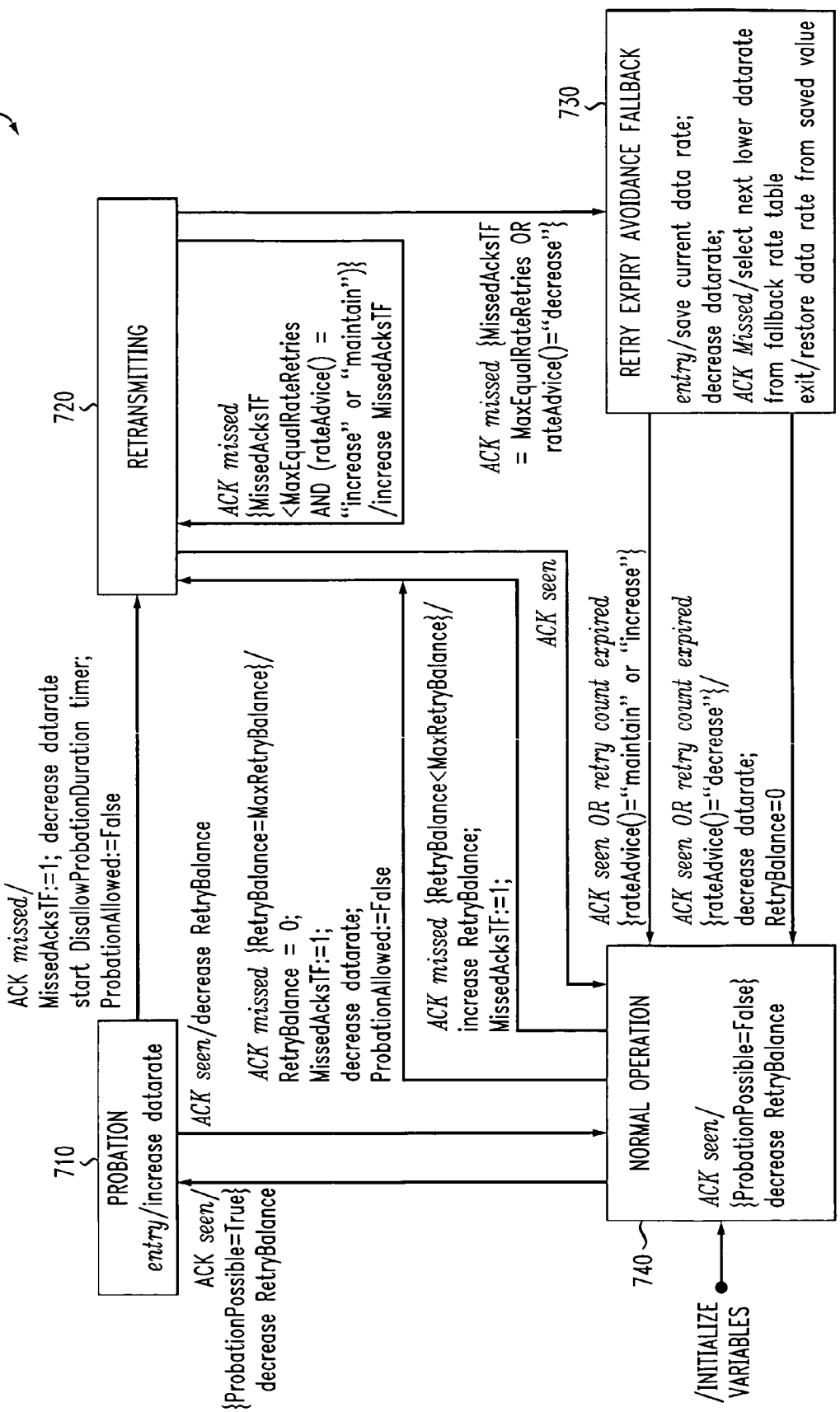
FIG. 7 is a flow chart describing an exemplary implementation of the automatic rate control process of FIG. 6 incorporating features of the present invention.

The exemplary automatic rate control process 700, discussed below in conjunction with FIG. 7, is driven by two events. An "ACK seen" event occurs when a transmission was successful, i.e., a positive acknowledgement feedback was received by the transmitter. Thus, an ACK seen event indicates that immediately after a transmission the proper ACK was received within the set time window. An "ACK missed" event occurs when a transmission was not successful, i.e., a negative acknowledgement feedback (or a missing positive acknowledgement at the time it was due) was received by the transmitter. Thus, an ACK missed event indicates that after a transmission, the time-out occurred that indicates that the ACK was not received.

In the IEEE 802.11 protocol, for example, an ACK message is sent to the transmitter within a specific time period, referred to as a Short Inter Frame Space (SIFS). Thus, when an ACK does not arrive, the transmitter knows that the transmission has failed.

As discussed further below in conjunction with FIG. 7, the automatic rate control process 700 has three mechanisms:

1. a probation mechanism, that allows the automatic rate control process 700 to try a higher data rate before switching to that data rate permanently;

2. a "retry balance," that is designed to protect against errors made by the data rate advisor 610 and to force a fallback when there are too many failed transmissions; and 3. a fallback mechanism, that will allow the algorithm to fallback to a lower data rate when the communication channel does not appear to support the current data rate, i.e., there are failed transmissions and the data rate advisor 610 gives a "decrease" advice.

As shown in FIG. 6, the automatic data rate controller 600 and the transmit power controller 300 are coupled together. The data rate advisor 610 processes the offset that is generated by the transmit power controller 300, while the transmit power controller 300 processes the current data rate in order not to violate the power amplifier's linearity constraints. It is noted that the automatic data rate controller 600 could operate with any known transmit power controller 300 and vice versa, as would be apparent to a person of ordinary skill in the art.

The following exemplary pseudo code may be employed by the data rate advisor 610 for communications between a station 200 and an access point 120.

```
if (DSQ.currAP==0)
    sq = DCQ.currAP
    table = DCQ_table
else
    sq = DSQ.currAP
    table = DSQ_table
end
if sq < table.lookup(r) – safety_margin
then
    advice is "decrease rate"
else if sq > table.lookup(r) + safety_margin
then
    advice is "increase rate"
else
        advice is "maintain rate"
end
``` where table.lookup(r) results in the signal quality value that belongs to a data rate, r, and r is the data rate currently being used for transmissions or retransmissions. DSQ.currAP and DSQ.currSTA are signal quality values for the current access point 120 and station 200, respectively. The signal quality values are derived, for example, from the received signal strength and the noise level as measured during a silence period by some averaging, or derived from the received EVM (error vector magnitude, as described in the 802.11a standard). The EVM is a measure of the error that the receiver experiences in the signal, for example, derived from the signal constellation in OFDM modulated signals.

The signal quality is used for the local site data rate control behavior with respect to the transmission to a remote device. However, the signal quality can be based on the received ACK signal because of sufficient symmetry in terms of (local/remote) power levels, through-the-air propagation path, (data frame/ACK) data rate. In an alternative embodiment, signal quality can be forwarded by the remote device as part of an ACK or another frame. Furthermore, an access point 120 communicates with different devices having different signal quality values and the access point 120 registers these different signal quality values, such as the data rate and other station dependent settings.

FIG. 7 is a flow chart describing an exemplary implementation of the automatic rate control process 700 incorporating features of the present invention. FIG. 7 illustrates the transitions between the various states of the automatic rate control process 700. Generally, the automatic rate control process 700 controls the transmit data rate. The automatic rate control process 700 tries to avoid the expiration of a retry counter for a frame when an ACK is missed. U.S. patent application Ser. No. 10/670,747, filed Sep. 25, 2003 and incorporated by reference herein discloses a method and apparatus for rate fallback in a wireless communication system that reduces a transmission rate for retransmission of a current frame to increase the probability that the current frame is correctly transmitted and acknowledged. A lower transmission rate increases the reliability of a transmission. The disclosed rate fallback techniques progressively and temporarily reduce the transmission rate to avoid the expiration of the frame's retry count. The transmission rate is reduced for the current frame while not affecting the transmission rate of subsequent frames, although subsequent frames may be sent at a lower transmission rate. Generally, the next frame should be transmitted at the highest rate permitted by the signal quality.

The automatic rate control process 700 increases the retry counter each time an ACK is missed. In one implementation, a separate long retry count can be maintained for frames larger than a given threshold (RTSThreshold), and another short retry count maintained for smaller frames. If the retry counter reaches its respective maximum, further attempts to deliver the frame are aborted. To the higher protocol layers, the frame appears dropped. To increase the chances of getting the message through, the automatic rate control process 700 may decrease the transmission rate rapidly but temporarily: the automatic rate control process 700 reevaluates the data rate after having seen the ACK, or after the retry counters have expired. The secondary goal of the automatic rate control process 700 is to adapt the data rate based on the rate advice generated by the data rate advisor 610. If the rate advice says that the current data rate is too high, then the automatic rate control process 700 will lower the data rate.

In the exemplary embodiment, the data rates are taken from a table of data rates (referred to herein as a CurrentUsedRates table) that the current station 200 and the other station 200 that it is communicating with have in common (the access point 120 in case of an ESS). The exemplary CurrentUsedRates table is referenced using an index TxRateCntr (notation: CurrentUsedRates{TxRateCntr}), and is sorted in order of increasing data rate. The variable maxTxRate is an index into the CurrentUsedRates table that is set to the last entry. Thus, the variable maxTxRate will reference the highest data rate that the two communicating stations 200 have in common.

A "rapid burst error recovery" is implemented by allowing the automatic rate control process 700 to rapidly increase the data rate in the following manner: as long as the rate advice from the data rate advisor 610 says "increase rate," then the automatic rate control process 700 will increase the data rate one step and send the next frame at that rate. If an ACK is seen immediately, the automatic rate control process 700 will send the next frame at the next higher rate, and so on. In the worst case scenario, for example, where the automatic rate control process 700 has to go from 1 Mbit/s to 54 Mbit/s through all 802.11b and 802.11g data rates, it would need 11 frames to recover.

As shown in FIG. 7, the retry expiry avoidance mechanism 740 operates as follows: if an ACK is missed, the automatic rate control process 700 examines the current situation and obtains a rate decision from the data rate advisor 610. If the decision is to lower the data rate, then retries for this fragment are transmitted on a rate that is lowered with each missed ACK. If the rate decision from the data rate advisor 610 is not to decrease the rate, then a certain limited number of retries is transmitted at the same data rate. This limited number is stored in a variable, MaxEqualRateRetries. The number of ACKs that are missed for the current frame are counted in a variable, MissedAcksTF.

As previously indicated, the automatic rate control process 700 also maintains a "retry balance" of the number of frames that needed a retry and the number of frames that did not need a retry, in the variable RetryBalance. For each frame that needs at least one retry, this retry balance is increased. For each frame that does not need a retry, the retry balance is decreased. If the retry balance exceeds a MaxRetryBalance threshold, i.e., there were 'MaxRetryBalance' more frames that needed a retry than those that immediately saw an ACK, then the automatic rate control process 700 falls back to a lower rate. In this manner, the automatic rate control process 700 will fallback to a lower data rate in situations where the rate decision is to "maintain data rate" or even "increase data rate" but there are still a lot of missed ACKs. The retry balance is reset whenever the automatic rate control process 700 has fallen back to a permanent lower data rate (not in the retry expiry avoidance state 740).

Thus, the RetryBalance variable is decreased when an "ACK seen" event happens and this was the first attempt to transmit the flame; and is increased if an "ACK missed" event happens and this was the first attempt to transmit the frame. The RetryBalance variable shall never become less than zero, and shall never become larger than a MaxRetryBalance variable.

The fallback rates that are used during the retry expiry avoidance fallback state 740 are listed in a fallback rate table. This fallback rate table can be created only once, when the automatic rate control process 700 is initialized.

As indicated above, FIG. 7 illustrates the transitions between the various states of the automatic rate control process 700. The exemplary automatic rate control process 700 includes four states, as follows:

a normal operation state 710, where the station 200 is normally operating;

a probation state 720, where the station 200 is trying to transmit one frame at a higher data rate;

a retransmitting state 730, where the station 200 is retransmitting a frame that has missed its ACK at the same data rate; and a retry expiry avoidance fallback state 740, where the station is retransmitting a frame that has missed its ACK at data rates that are lower with each missed ACK, to optimize the probability that eventually the frame will be acknowledged.

As shown in FIG. 7, the automatic rate control process 700 will go into the probation state 720 (where the 'data rate for the next frame' value will be one data rate higher than the current data rate) when the following conditions are all satisfied:

an "ACK seen" event happens and this was the first attempt to transmit this frame;

the rate advice is 'increase';

the current data rate is not the highest data rate possible; and the ProbationAllowed variable holds the value TRUE.

As shown in FIG. 7, the automatic rate control process 700 will go into the retry expiry avoidance fallback state 740 (where the 'data rate for the next frame' will be one data rate lower than the current data rate) when one of the following conditions are satisfied:

a "No ACK seen" event happens AND the RetryBalance variable holds the value MaxRetryBalance, AND the current data rate is not the lowest data rate; or when a "No ACK seen" event happens, AND the data rate advice is 'decrease', AND the current data rate is not the lowest data rate; or when a "No ACK seen" event happens AND the algorithm is in probation mode.

As shown in FIG. 7, a number of exemplary events trigger transitions among the various states 710, 720, 730 and 740 and a number of other actions (defined below), as follows:

DisallowProbationDuration—This event indicates that the timer, used to temporarily disallow trying higher data rates, has expired so that probations are enabled again. The value for DisallowProbationDuration is set at a fixed value of approximately 0.1 seconds;

ACK missed—This event indicates that after a transmission, the timeout occurred that indicates that the ACK was not received. This indicates either that the message was not received by the other station 200 (so that no ACK was sent at all), or that the ACK itself was not received;

ACK seen—This event indicates immediately after a transmission the proper ACK was received within the set time window; and retry count expired—This event happens when the retry counter (or a Short Retry Count or a Long Retry Count) that is appropriate for the current frame has reached its maximum value.

As shown in FIG. 7, a number of exemplary conditions also determine whether a transition form one state 710, 720, 730 and 740 to another state occurs or when an appropriate action (defined below) is triggered, as follows:

{rateAdvice( )="increase"}—This condition is TRUE if according to the rate advice formula (i.e., the exemplary pseudo code employed by the data rate advisor 610) the current data rate can be increased. The notation rateAdvice( ) indicates that it is not a variable, but a function result. A value for the rateAdvice should be calculated each time this condition (or the two below) is evaluated;

{rateAdvice( )="maintain"}—This condition is TRUE if according to the rate advice formula the current data rate should be maintained;

{rateAdvice( )="decrease"}—This condition is TRUE if according to the rate advice formula the current data rate should be decreased;

{ProbationAllowed=False}—This condition indicates that the ProbationAllowed variable is set to False, which means that the automatic rate control process 700 is inhibiting attempts to transmit at a higher data rate. The automatic rate control process 700 will continue to do this until the timer DisallowProbationDuration expires. The goal is to prevent the automatic rate control process 700 from trying higher data rates during a certain period after it has fallen back to a lower data rate;

{ProbationAllowed=True}—This condition indicates that the ProbationAllowed variable is set to True, which means that the algorithm is not inhibiting attempts to transmit at a higher data rate;

{RetryBalance=MaxRetryBalance}—This variable is True if the variable RetryBalance (that reflects the balance between frames that had to be retried and frames that saw an ACK at the first try) has reached the value MaxRetryBalance. The automatic rate control process 700 will then drop to a lower data rate, regardless of the rate advice;

{[MissedAcksTF<MaxEqualRateRetries}—This condition is true if the variable MissedAcksTF (that counts the number of ACKs that the current ("This Frame") frame has missed) contains a value less than the value in MaxEqualRateRetries;

{MissedAcksTF=MaxEqualRateRetries}—This condition is true if the variable MissedAcksTF contains a value greater than the value in MaxEqualRateRetries. This means that the number of transmission retries at the current rate has been reached, and that the automatic rate control process 700 will continue to send retries at lower data rates; and ProbationPossible—This condition is a 'macro' for the following condition: "if rateAdvice( )='increase' AND ProbationAllowed=True AND TxRateCntr<maxTxRate", which is only True if the station can actually go to the probation state and try a higher data rate.

As shown in FIG. 7, a number of exemplary actions are initiated, as follows:

Initialize variables—TxRateCntr is set to point at the last entry in CurrentUsedRates; this is the highest data rate that the stations have in common. The fallback rate table is created. RetryBalance is set to 0;

increase data rate—TxRateCntr is increased to point at the next higher data rate in CurrentUsedRates, if one is available. AdvisedRate is set to this data rate;

decrease data rate—TxRateCntr is decreased so that it points to the next lower data rate in CurrentUsedRates if one is available. AdvisedRate is set to this data rate;

increase MissedAcksTF—The MissedAcksTF variable is increased by 1;

save current transmit rate—The value of the TxRateCntr variable (representing the current transmit rate) is temporarily stored in a particular location;

restore transmit rate from stored value—The previously saved value of TxRateCntr is retrieved from the location it was saved to (see above), and AdvisedRate is updated accordingly;

select next lower data rate from the fallback rate table—Selects the next lower data rate from the fallback rate table and sets AdvisedRate accordingly;

MissedAcksTF:=1—The MissedAcksTF variable is set to the value 1;

ProbationAllowed=False—The ProbationAllowed variable is set to False to indicate that the algorithm will not try to increase the data rate for a certain period (using timer DisallowProbationDuration);

ProbationAllowed=True—The ProbationAllowed variable is set to True to indicate that the algorithm will try to switch to a higher data rate once the channel quality assessment suggests that the channel is suited for a higher data rate;

start DisallowProbationDuration—The DisallowProbationDuration timer is started;

decrease RetryBalance—the RetryBalance variable is decreased by 1, only if it is greater than zero. This variable must never become less than zero; and increase RetryBalance—the retryBalance variable is increased by 1.

It is to be understood that the embodiments and variations shown and described herein are merely illustrative of the principles of this invention and that various modifications may be implemented by those skilled in the art without departing from the scope and spirit of the invention.

We claim:

1. A wireless communication device, comprising:
a dynamic transmit power controller that adapts a transmit power level based on a transmission rate of data, wherein said dynamic transmit power controller selects said transmit power level that is about a maximum allowable power level based on a directional gain of an antenna that is about a maximum directional gain of the antenna.

2. The wireless communication device of claim 1, wherein said maximum allowable power level is based on limits specified for a given region and frequency band.

3. The wireless communication device of claim 1, wherein said dynamic transmit power controller selects a maximum capable power level.

4. The wireless communication device of claim 3, wherein said maximum capable power level is based on said transmission rate.

5. The wireless communication device of claim 3, wherein said maximum capable power level is based on characteristics of a transmitter output amplifier.

6. The wireless communication device of claim 1, further comprising a comparator for selecting said transmit power level based on a minimum of a maximum allowable power level and a maximum capable power level.

7. The wireless communication device of claim 1, wherein said device is implemented in accordance with the IEEE 802.11 Standard.

8. The wireless communication device of claim 1, wherein said device is implemented in accordance with the HIPERLAN/2 Standard.

9. A method for wireless communication, comprising the steps of:
transmitting one or more frames of data; and
adapting a transmit power level based on a transmission rate of said data, wherein said transmit power level is selected that is about a maximum allowable power level based on a directional gain of an antenna that is about a maximum directional gain of the antenna.

10. The method of claim 9, wherein said maximum allowable power level is based on limits specified for a given region and frequency band.

11. The method of claim 9, wherein said dynamic transmit power controller selects a maximum capable power level.

12. The method of claim 11, wherein said maximum capable power level is based on said transmission rate.

13. The method of claim 11, wherein said maximum capable power level is based on characteristics of a transmitter output amplifier.

14. The method of claim 9, further comprising the step of selecting said transmit power level based on a minimum of a maximum allowable power level and a maximum capable power level.

15. A method for wireless communication, comprising the steps of:
transmitting one or more frames of data; and
selecting a transmit power level based on a lower value of a maximum allowable power level and a maximum capable power level, wherein at least one of said maximum allowable power level and said maximum capable power level are based on a transmission rate of said data, and wherein said transmit power level is selected that is about said maximum allowable power level based on a directional gain of an antenna that is about a maximum directional gain of the antenna.

16. The method of claim 15, wherein said maximum allowable power level is based on limits specified for a given region and frequency band.

17. The method of claim 15, wherein said maximum capable power level is based on said transmission rate.

18. The method of claim 15, wherein said maximum capable power level is based on characteristics of a transmitter output amplifier.

* * * * *